US010031405B2

(12) United States Patent
Matsubara (10) Patent No.: US 10,031,405 B2
(45) Date of Patent: Jul. 24, 2018

(54) LIGHT SOURCE DEVICE AND PROJECTOR WITH REDUCING OPTICAL SYSTEM HAVING ADJUSTABLE POSITION FOR POSITIVE POWER LENS

(71) Applicant: NEC Display Solutions, Ltd., Tokyo (JP)

(72) Inventor: Masateru Matsubara, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/315,700

(22) PCT Filed: Jun. 12, 2014

(86) PCT No.: PCT/JP2014/065568
§ 371 (c)(1),
(2) Date: Dec. 1, 2016

(87) PCT Pub. No.: WO2015/189947
PCT Pub. Date: Dec. 17, 2015

(65) Prior Publication Data
US 2017/0199450 A1    Jul. 13, 2017

(51) Int. Cl.
*G03B 21/14*    (2006.01)
*G03B 21/20*    (2006.01)
(Continued)

(52) U.S. Cl.
CPC ............. *G03B 21/204* (2013.01); *F21K 9/64* (2016.08); *F21V 5/007* (2013.01); *F21V 9/16* (2013.01);
(Continued)

(58) Field of Classification Search
CPC ... F21K 9/64; F21V 5/007; F21V 9/16; G03B 21/142; G03B 21/2013; G03B 21/2033; G03B 21/204; F21Y 2115/30
See application file for complete search history.

(56) References Cited

U.S. PATENT DOCUMENTS 5,386,312 A * 1/1995 Spencer ................ G02B 13/00
359/196.1
2012/0249972 A1* 10/2012 Kurosaki ........... G03B 21/2013
353/31

FOREIGN PATENT DOCUMENTS

JP    2005-301054 A    10/2005
JP    2011-075899 A    4/2011
(Continued)

OTHER PUBLICATIONS

International Search Report (ISR) (PCT Form PCT/ISA/210), in PCT/JP2014/065568, dated Sep. 9, 2014.
(Continued)

*Primary Examiner* — Sultan Chowdhury
*Assistant Examiner* — Magda Cruz
(74) *Attorney, Agent, or Firm* — McGinn IP Law Group, PLLC (57) ABSTRACT

A light source device includes: a phosphor unit that is provided with a phosphor; an excitation light source that supplies excitation light that excites the phosphor; a reducing optical system that reduces the luminous flux diameter of the excitation light; and a light condensing optical system that condenses, on the phosphor unit, excitation light for which the luminous flux diameter was reduced by the reducing optical system. The reducing optical system includes: a plurality of lenses including two lenses having positive power; and a lens-moving section that moves the lens back and forth along the direction of the optical axis. The lens is disposed on the excitation light source side, and (Continued)

has a lower power than the lens. The refractive index of the lens is equal to or smaller than the refractive indexes of the other lenses of the reducing optical system.

18 Claims, 3 Drawing Sheets

(51) Int. Cl.
  *F21K 9/64* (2016.01)
  *F21V 9/16* (2006.01)
  *F21V 5/00* (2018.01)
  *F21V 9/30* (2018.01)
  *F21Y 115/30* (2016.01)

(52) U.S. Cl.
  CPC .............. *F21V 9/30* (2018.02); *G03B 21/142* (2013.01); *G03B 21/2013* (2013.01); *G03B 21/2033* (2013.01); *F21Y 2115/30* (2016.08)

(56) References Cited

FOREIGN PATENT DOCUMENTS

| JP | 2012-133337 A | 7/2012 |
| JP | 2012-215633 A | 11/2012 |
| JP | 2012-220811 A | 11/2012 |
| JP | 2013-025215 A | 2/2013 |
| WO | WO 2012/066654 A1 | 5/2012 |
| WO | WO 2014/038434 A1 | 3/2014 |

OTHER PUBLICATIONS

Japanese Notice of Decision to Grant a Patent dated Oct. 3, 2017 in Japanese Application No. 2016-527558 with an English translation thereof.

\* cited by examiner

LIGHT SOURCE DEVICE AND PROJECTOR WITH REDUCING OPTICAL SYSTEM HAVING ADJUSTABLE POSITION FOR POSITIVE POWER LENS

TECHNICAL FIELD

The present invention relates to a light source device that is equipped with a phosphor and to a projector that uses the light source device.

BACKGROUND ART

Although high-luminance projectors are provided that take mercury lamps as a light source, mercury lamps contain mercury, a hazardous material, and taking into consideration the impact upon the environment, there is consequently an urgent need for the development of mercury-free products. Against this background, the development of LEDs (Light Emitting Diodes) and LDs (Laser Diodes) has been advanced, and low-luminance LED projectors and laser projectors that take these devices as light sources are already being introduced into the marketplace.

However, because high-luminance green LEDs or compact, high-output green LDs are not yet being mass-produced, a high-luminance LED projector or laser projector has not yet been introduced to the market.

In response, high-luminance projectors that use a phosphor as a light source have been proposed. In Patent Documents 1 and 2, projector light source devices that employ phosphors are described.

The light source device described in Patent Document 1 has a solid-state light source unit, a condensing unit, a diffuser, a dichroic mirror, a condenser lens, a wave plate, a reflecting plate, and a fluorescent light-emitting plate.

The solid-state light source unit is equipped with a plurality of blue semiconductor lasers that are arranged in array form. A collimator lens is provided for each blue semiconductor laser, and the blue light supplied from each blue semiconductor laser is converted to parallel luminous flux by each corresponding collimator lens. The solid-state light source unit is configured to emit both S-polarized blue light and P-polarized blue light.

The blue light emitted from the solid-state light source unit is irradiated into a dichroic mirror by way of a condensing unit and diffuser. The condensing unit is made up of a first lens that has positive power (also referred to as positive refractive power) and a second lens that has negative power (also referred to as negative refractive power), the first lens being arranged on the solid-state light source unit side. The first and second lenses reduce the luminous flux diameter of the blue light from the solid-state light source unit. The diffuser diffuses the blue light from the condensing unit.

The dichroic mirror has the property of transmitting light that is irradiated as P-polarized light and reflecting light irradiated as S-polarized light in the blue wavelength band, and further, transmitting light of the green and red wavelength bands. Of the blue diffused light from the diffuser, the S-polarized light is reflected by the dichroic mirror and irradiated into the condenser lens. On the other hand, the P-polarized light is transmitted by the dichroic mirror without alteration and irradiated into the wave plate.

The blue reflected light (S-polarized light) from the dichroic mirror is condensed upon the fluorescent light-emitting plate by the condenser lens. The fluorescent light-emitting plate is a rotatable disk-shaped component and includes a phosphor layer. The phosphor layer includes a red phosphor region that produces red fluorescent light and a green phosphor region that produces green fluorescent light, the blue light being successively irradiated upon the red phosphor region and green phosphor region by the rotation of the fluorescent light-emitting plate. The red fluorescent light from the red phosphor region and the green fluorescent light from the green phosphor region each irradiate the dichroic mirror by way of the condenser lens. The red fluorescent light and green fluorescent light pass through the dichroic mirror.

The transmitted blue light from the dichroic mirror (P-polarized light) passes through the wave plate and is irradiated upon the reflecting plate. The reflecting plate reflects the irradiated blue light in the direction of the wave plate. The reflected blue light from the reflecting plate again passes through the wave plate and is irradiated upon the dichroic mirror. The transmitted blue light (P-polarized light), by twice passing through the wave plate, is converted to S-polarized light. The blue light from the wave plate (S-polarized light) is reflected by the dichroic mirror. The reflected blue light (S-polarized light) from the dichroic mirror is emitted from the light source device on the same optical path as the red fluorescent light and green fluorescent light that were transmitted through the dichroic mirror.

The light source device described in Patent Document 2 includes a plurality of blue LDs (laser diodes), a plurality of collimator lenses, a condenser lens, a concave lens, a dichroic mirror, a condenser lens group, and a phosphor wheel.

A collimator lens is provided for each blue LD, and the blue light supplied from each blue LD is converted to parallel luminous flux by each corresponding collimator lens. The blue light emitted by way of each collimator lens from each blue LD is irradiated by way of the condenser lens, the concave lens, the dichroic mirror, and the condenser lens group on a phosphor layer of the phosphor wheel on which a green phosphor is formed.

Each blue LD and each collimator lens are arranged such that the irradiated regions on the phosphor layer of the blue light from each blue LD mutually overlap.

In the projectors provided with the light source devices that are described in Patent Document 1 and Patent Document 2, the fluorescent light that is produced by the phosphor is irradiated by way of an illumination optical system on a display element such as a digital micromirror device (DMD) or a liquid crystal display element. The image that is formed by the display element is projected on an outside screen by a projection optical system.

When the irradiation size of the excitation light is reduced, the light density per unit area increases, whereby the peak light intensity of the excitation light increases. Conversely, an increase in the irradiation size of the excitation light lowers the light density per unit area, and the peak light intensity of the excitation light therefore decreases. The peak light intensity of excitation light is thus determined by the irradiation size of the excitation light.

The emitted light intensity of a phosphor typically depends on the light intensity of the excitation light. However, when the light intensity of excitation light reaches a particular value, the phenomenon of saturation or decrease occurs according to which the emitted light intensity of the phosphor does not increase despite any further increase of the light intensity of the excitation light, and the wavelength conversion efficiency from excitation light to fluorescent light therefore drops. As a result, the irradiation size of the excitation light must be set such that this type of phenomenon does not occur (first limitation).

In addition, the emitted light size of the phosphor region (phosphor layer) depends on the irradiation size (spot size) of the excitation light. Increasing the irradiation size of the excitation light increases the light emission size, thereby complicating the efficient capture of the fluorescent light by the illumination optical system or projection optical system. As a result, the irradiation size of the excitation light must be set such that the fluorescent light can be reliably captured by the illumination optical system and projection optical system (second limitation).

Normally, the irradiation size of excitation light is set to a size suitable for satisfying the above-described first and second limitations.

LITERATURE OF THE PRIOR ART

Patent Documents

Patent Document 1: JP2012-133337A
Patent Document 2: JP2012-215633A

DISCLOSURE OF INVENTION

The light source devices described in Patent Documents 1 and 2 have the following problems:

The optical components such as lenses that make up a light source device have variations in performance due to individual differences. In addition, variations occur in the assembled positions when the optical components are assembled. Due to these variations of the optical components, the irradiation size of the excitation light may diverge from the appropriate size. When the irradiation size of the excitation light diverges from the appropriate size, satisfying the previously described first limitation or second limitation becomes problematic, and the problem therefore arises that the wavelength conversion efficiency falls and the efficient capture of fluorescent light by the illumination optical system and projection optical system decreases.

In addition, in the light source devices described in Patent Documents 1 and 2, aberration (in particular, distortion aberration or spherical aberration) occurs because luminous flux is bent greatly in lenses on the side close to the excitation light source (blue LD array), i.e., a lens on the side of the light source has high power, and moreover, has a high index of refraction. This aberration that occurs in lenses on the light source side is difficult to correct by later-stage optical systems. As a result, distortion aberration causes distortion in the light source image (the image of the blue LD array) that is formed in the phosphor region (phosphor layer), and spherical aberration causes nonuniformity of the intensity distribution of the excitation light by blurring of portions of the light source image. When the intensity distribution of the excitation light is uneven, a phenomenon such as saturation occurs in portions of high light intensity, resulting in a decrease of wavelength conversion efficiency.

It is an object of the present invention to provide a light source device and a projector that can solve the above-described problems, that can reliably irradiate excitation light at an appropriate size, and that can limit any decrease in the wavelength conversion efficiency or can limit any decrease in the efficiency of capturing fluorescent light through an illumination optical system or a projection optical system.

According to an aspect of the present invention for achieving the above-described objects, a light source device is provided that includes:
a phosphor unit that is provided with a phosphor;
an excitation light source that supplies excitation light that excites the phosphor;
a reducing optical system that reduces a luminous flux diameter of the excitation light that is supplied from the excitation light source; and
a condensing optical system that condenses, on the phosphor unit, excitation light for which the luminous flux diameter was reduced by the reducing optical system;
wherein:
the reducing optical system includes:
a plurality of lenses that include two or more lenses having positive power; and
a holding section that holds the plurality of lenses,
wherein:
of the two or more lenses, the lens having the lowest positive power is arranged on the side of the excitation light source;
the holding section includes a lens-moving section that moves the lens having the lowest positive power back and forth along the direction of the optical axis of the reducing optical system; and
the index of refraction of the lens having the lowest positive power is equal to or lower than the index of refraction of other lenses of the reducing optical system.

According to another aspect of the present invention, a projector is provided that includes:
the above-described light source device;
a display element that spatially modulates light that is supplied from the light source device to form an image; and
a projection optical system that enlarges and projects the image that was formed by the display element.

DESCRIPTION OF EMBODIMENT

An exemplary embodiment of the present invention is next described with reference to the accompanying drawings.

Figure 1:
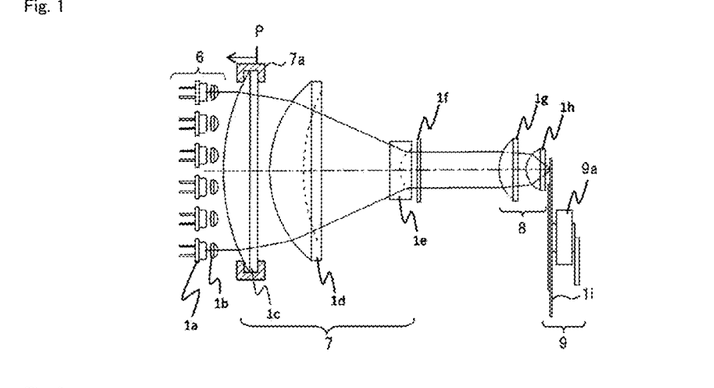
FIG. 1 is a schematic view showing the configuration of a light source device according to an exemplary embodiment of the present invention.

FIG. 1 is a schematic view showing the configuration of a light source device according to an exemplary embodiment of the present invention.

Referring to FIG. 1, the light source device includes solid-state light source unit 6 that is the excitation light source, reducing optical system 7, condensing optical system 8, diffuser 1f, and phosphor unit 9.

Solid-state light source unit 6 includes a plurality of solid-state light sources 1a and a plurality of collimator lenses 1b. Solid-state light sources 1a are, for example, blue laser diodes (LD) that supply blue light having peak wavelength in the blue wavelength band. Here, 24 blue LDs are arranged in 6×4 matrix form. However, the number of blue LDs is not limited to 24. The number of blue LDs may be increased or decreased as necessary.

Collimator lenses 1b are provided for each of solid-state light sources 1a, the excitation light supplied by each solid-state light source 1a being converted to parallel luminous flux by corresponding collimator lens 1b.

Reducing optical system 7 reduces the diameter of luminous flux of the excitation light (pseudo-parallel light) from solid-state light source unit 6. Reducing the emitted luminous flux diameter to less than the incident luminous flux diameter allows reduction of the size of components that are arranged in stages that follow reducing optical system 7.

Reducing optical system 7 includes lenses 1c-1e and a holding section that holds these lenses 1c-1e. Lens 1c, lens 1d, and lens 1e are arranged in that order from solid-state light source unit 6. Lenses 1c and 1d both have positive power (positive refractive power) and lens 1e has negative power (negative refractive power). The power of lens 1c is lower than the power of lens 1d. The index of refraction of lens 1c is less than the index of refraction of the other lenses of reducing optical system 7.

The holding section includes lens moving section 7a that moves lens 1c back and forth along the direction of the optical axis of reducing optical system 7. Lens moving section 7a includes a lens frame, a moving axle that is provided with a feed screw for moving the lens frame back and forth along the direction of the optical axis, and a rotation section that is linked to the movement axle. When the rotation section is rotated, the movement axle rotates in unison with the rotational action, and the lens frame moves along the direction of the optical axis. The rotation of the rotation section includes forward rotation and reverse rotation. When the rotation section is forward-rotated, the lens frame moves in the direction of solid-state light source unit 6, and when the rotation section is reverse-rotated, the lens frame moves in the direction opposite solid-state light source unit 6. In this way, lens 1c can be freely moved back and forth along the direction of the optical axis of reducing optical system 7 to allow variation of the power of reducing optical system 7. The configuration of lens moving section 7a is only an example, and lens moving section 7a may be of any configuration that can cause lens 1c to move along the optical axis of reducing optical system 7.

The lens configuration of reducing optical system 7 is not limited to lenses 1c-1e. Reducing optical system 7 may be of a configuration including two or more lenses having positive power and at least one lens having negative power. However, of the two or more lenses having positive power, the lens having the lowest power is arranged on the side of solid-state light source unit 6, and moreover, is supported by lens moving section 7a. The index of refraction of the lens having the lowest power that is supported by lens moving section 7a is equal to or lower than the index of refraction of the other lenses of reducing optical system 7.

The excitation light from reducing optical system 7 is incident to condensing optical system 8 by way of diffuser 1f. Diffuser 1f diffuses the excitation light from reducing optical system 7. The diffusion angle is, for example, in the order of 3 degrees. The diffusion angle here refers to the angle formed by a light ray that passes along the center of the luminous flux (center light ray) and a light ray that passes along the outermost luminous flux.

Condensing optical system 8 is provided with lenses 1g and 1h and condenses, on phosphor wheel 1i of phosphor unit 9, the excitation light that is incident from reducing optical system 7 by way of diffuser 1f. The lens configuration of condensing optical system 8 is not limited to lenses 1g and 1h. Condensing optical system 8 may include three or more lenses.

Figure 2:
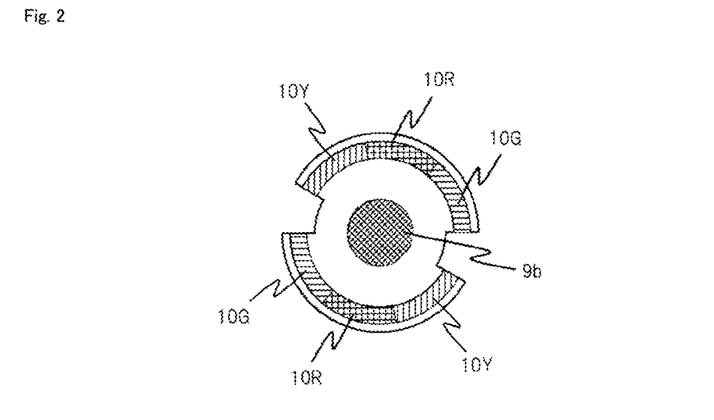
FIG. 2 is a schematic view showing an example of the phosphor wheel used in the light source device shown in FIG. 1.

Phosphor unit 9 includes phosphor wheel 1i, and drive unit (motor) 9a that rotates phosphor wheel 1i. FIG. 2 shows an example of phosphor wheel 1i.

Referring to FIG. 2, phosphor wheel 1i is provided with disk-shaped reflecting mirror 10. The center portion of reflecting mirror 10 is linked to the rotational axis of drive unit 9a by way of hub 9b. A phosphor region of a predetermined width is formed along the periphery of reflecting mirror 10, and this phosphor region is divided between first and second phosphor regions by two gaps 10a. The first and second phosphor regions each include yellow phosphor region 10Y, red phosphor region 10R, and green phosphor region 10G. Yellow phosphor region 10Y, red phosphor region 10R, and green phosphor region 10G are aligned in order in the circumferential direction.

In order to achieve rotational balance of phosphor wheel 1i, gaps 10a are provided in two opposite portions of the periphery of reflecting mirror 10. Gaps 10a serve as transmission regions. By rotating phosphor wheel 1i at a predetermined speed, the blue light (excitation light) from solid-state light source unit 6 is successively irradiated on yellow phosphor region 10Y, red phosphor region 10R, green phosphor region 10G, and the transmission region of gap 10a.

Yellow phosphor region 10Y contains a phosphor that emits yellow fluorescent light. Red phosphor region 10R contains a phosphor that emits red fluorescent light. Green phosphor region 10G contains a phosphor that emits green fluorescent light. The yellow phosphor, red phosphor, and green phosphor can all be excited by the blue light from solid-state light source unit 6. The yellow fluorescent light contains light from the green to the red wavelength range.

Yellow fluorescent light from yellow phosphor region 10Y, red fluorescent light from red phosphor region 10R, green fluorescent light from green phosphor region 10G, and blue light from the transmission region of gap 10a are used as the output light of the light source device. The ratios of the areas in the circumferential direction (circumferential division ratio) of each of yellow phosphor regions 10Y, red phosphor regions 10R, green phosphor regions 10G, and the transmission regions of gaps 10a are set as appropriate according to the balance of the light intensity of each of the yellow light, red light, green light, and blue light that are contained in the output light of the light source device.

The actual operation of the light source device of the present exemplary embodiment is next described.

The blue light (excitation light) from solid-state light source unit 6, after having undergone reduction of the luminous flux diameter by reducing optical system 7 and diffusion by diffuser 1f, is condensed on phosphor wheel 1i by condensing optical system 8. When the rotation section of lens moving section 7a is forward-rotated or reverse-rotated, the focused focal distances of lenses 1c and 1d change, with the result that the irradiation size (spot size) of the excitation light on phosphor wheel 1i changes. The form of the irradiation spot of the excitation light corresponds to the shape of the arrangement of solid-state light sources 1a.

Figure 3:
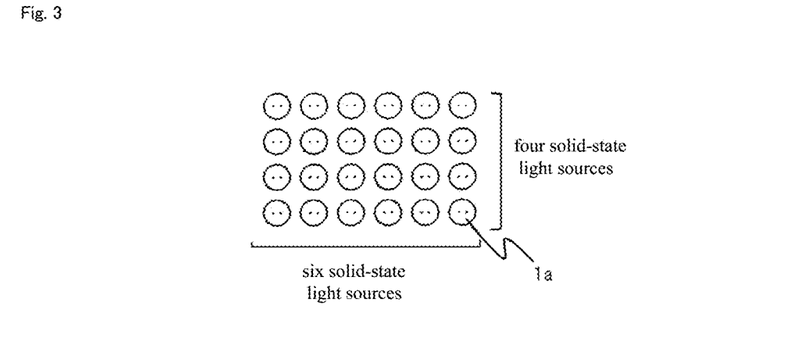
FIG. 3 is a schematic view showing the arrangement of solid-state light sources of the solid-state light source unit of the light source device shown in FIG. 1.

FIG. 3 gives a schematic representation of the shape of arrangement of solid-state light sources 1a of solid-state light source unit 6. In this example, solid-state light sources 1a that are made up of blue LDs are arranged in a 6×4 matrix form. Reducing optical system 7 and condensing optical system 8 form the light source image of the 24 blue LDs that are arranged in 6×4 matrix form upon phosphor wheel 1i.

Figure 4A:
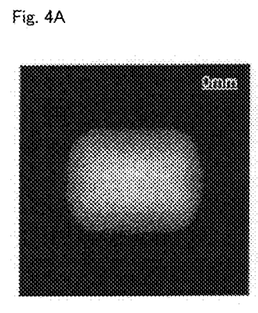
FIG. 4A is a schematic view showing the intensity distribution of excitation light that is irradiated upon the phosphor wheel when the amount of lens movement is 0 mm.
Figure 4B:
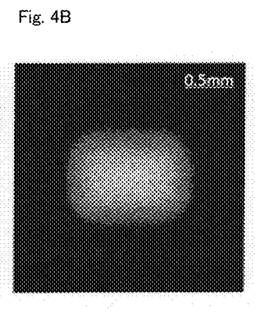
FIG. 4B is a schematic view showing the intensity distribution of excitation light that is irradiated upon the phosphor wheel when the amount of lens movement is 0.5 mm.
Figure 4C:
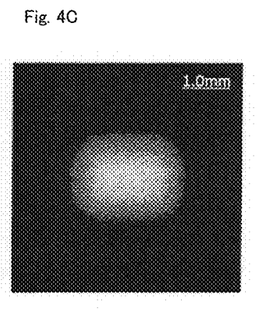
FIG. 4C is a schematic view showing the intensity distribution of excitation light that is irradiated upon the phosphor wheel when the amount of lens movement is 1.0 mm.

FIGS. 4A-4c show the intensity distribution of the excitation light that is irradiated on phosphor wheel 1i. FIG. 4A shows the intensity distribution of the excitation light in a state in which lens 1c is arranged at a predetermined reference position. FIG. 4B shows the intensity distribution of the excitation light in a state in which lens 1c is moved by 0.5 mm toward solid-state light source unit 6 from the reference position. FIG. 4C shows the intensity distribution of excitation light in a state in which lens 1c is moved by 1.0 mm toward solid-state light source unit 6 from the reference position.

Figure 5A:
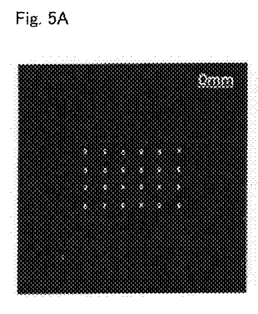
FIG. 5A is a schematic view showing the light source image that is irradiated upon the phosphor wheel when the amount of lens movement is 0 mm.
Figure 5B:
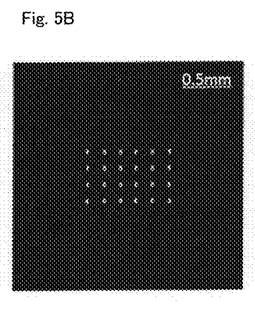
FIG. 5B is a schematic view showing the light source image that is irradiated upon the phosphor wheel when the amount of lens movement is 0.5 mm.
Figure 5C:
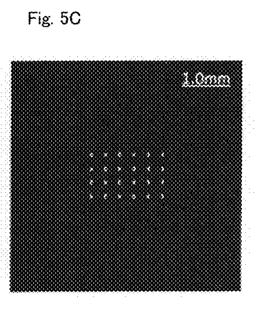
FIG. 5C is a schematic view showing the light source image that is irradiated upon the phosphor wheel when the amount of lens movement is 1.0 mm.

FIGS. 5A-5C schematically show the light source image that is formed on phosphor wheel 1i in a state in which diffuser 1f has been removed. FIG. 5A shows the light source image in a state in which lens 1c is arranged at position P shown in FIG. 1. FIG. 5B shows the light source image in a state in which lens 1c has been moved 0.5 mm toward solid-state light source unit 6 from position P. FIG. 5C shows the light source image in a state in which lens 1c has been moved 1.0 mm toward solid-state light source unit 6 from position P.

As can be seen from FIGS. 4A and 5A, in a state in which lens 1c is arranged at position P, the excitation light from solid-state light source unit 6 is irradiated on phosphor wheel 1i after undergoing reduction while maintaining the blue LD arrangement shape (rectangular) state. As can be seen from FIGS. 4B and 5B, in a state in which lens 1c is moved just 0.5 mm toward solid-state light source unit 6 from position P, the excitation light from solid-state light source unit 6 is irradiated on phosphor wheel 1i after having undergone reduction while maintaining the blue LD light source arrangement (rectangular) state Similarly, as can be seen from FIGS. 4C and 5C, in a state in which lens 1c has been moved 1.0 mm toward solid-state light source unit 6 from position P, the excitation light from solid-state light source unit 6 is irradiated on phosphor wheel 1i after having undergone reduction while maintaining the blue LD light source arrangement (rectangular) state.

In addition, as can be seen from FIGS. 4A-4C, the irradiation size of the excitation light is greatest in a state in which lens 1c is arranged at position P, and the irradiation size of the excitation light becomes gradually smaller as lens 1c moves toward solid-state light source unit 6. In this way, the focused focal distance of lens 1c and lens 1d changes when lens 1c is moved along the optical axis of reducing optical system 7, with the result that the irradiation size of the excitation light changes.

However, the spot shape of the excitation light is maintained in the shape of the blue LD light source array (rectangular) despite the change in the irradiation size of the excitation light. The arrangement of the spacing of the blue LDs of solid-state light source unit 6 and the diffusion angle of diffuser 1f are designed such that the intensity distribution of the excitation light that passes through diffuser 1f is a uniform intensity distribution referred to as "top hat," and the uniform intensity distribution can be maintained by maintaining the spot shape of the excitation light.

According to the light source device of the present exemplary embodiment as described hereinabove, when the irradiation size of the excitation light diverges from the appropriate size due to variations in the positioning of assembly and variations due to individual differences of optical components such as lenses, the irradiation size can be adjusted to the appropriate size by moving lens 1c, whereby any decrease in the light output power level of the light source device due to variations of the optical components can be reduced, and the light source device will have a stabilized high light output level.

In addition, because the light emission size of fluorescent light depends on the irradiation size of the excitation light, the light emission size of fluorescent light can be made the appropriate size by adjusting the irradiation size of the excitation light. When the light source device of the present exemplary embodiment is applied to a projector, the fluorescent light that is supplied from the light source device can be reliably captured in the illumination optical system and projection optical system.

Further, aberration (in particular, distortion aberration and spherical aberration) occurs when luminous flux is greatly bent in the lens close to the light source, and in some cases, this aberration is difficult to correct in the succeeding optical system. In such cases, the intensity distribution of the excitation light becomes uneven due to the occurrence of aberration (in particular, distortion aberration and spherical aberration). For example, in the light source image of solid-state light sources 1a that are arranged in a 6×4 matrix form, as shown in FIG. 5A, the intensity distribution of the excitation light becomes non-uniform due to distortion of the light source image by distortion aberration or due to partial blurring of the light source image by spherical aberration and the consequent overlapping of adjacent light source images. When the intensity distribution of the excitation light becomes uneven, the wavelength conversion efficiency may decrease due to the phenomenon of saturation of the phosphor in portions having high light intensity. Accordingly, reducing the occurrence of aberration in preceding sections is effective for making the intensity distribution of the excitation light uniform. In the light source device of the present exemplary embodiment, the occurrence of aberration (in particular, distortion aberration and spherical aberration) is reduced by making the positive power of lens 1c that is close to solid-state light source unit 6 lower than that of other lenses, and moreover, by making the index of refraction of lens 1c lower than in other lenses. In this way, the intensity distribution of the excitation light is made uniform.

Still further, when the excitation light intensity distribution is a Gaussian distribution, the light intensity may be high in the central portion of the spot of the excitation light, resulting in a decrease of the wavelength conversion efficiency due to a phenomenon such as the saturation of the phosphor. According to the light source device of the present exemplary embodiment, the intensity distribution of the excitation light is made uniform by the arrangement of solid-state light sources 1a in array form and the diffusion of the excitation light at diffuser 1f.

Finally, by rotating phosphor wheel 1i, the light energy quantity that is supplied to the phosphor per unit time can be decreased and the rise in temperature of the phosphor caused by the excitation light can be limited, whereby any decrease in the wavelength conversion efficiency resulting from the saturation of the light emission intensity of the phosphor or rise in temperature can be reduced.

(Projector)

Figure 6:
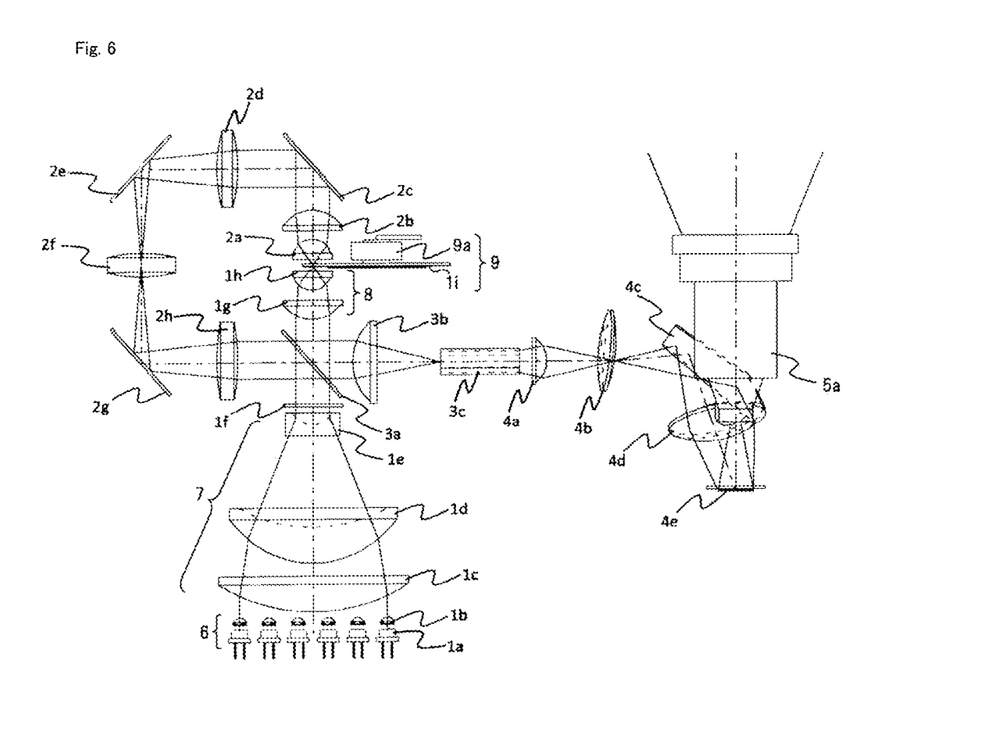
FIG. 6 is a schematic view showing an example of a projector that is equipped with the light source device shown in FIG. 1.

FIG. 6 is a schematic view showing an example of a projector that is provided with the light source device of the present invention.

Referring to FIG. 6, the projector includes a light source device, a relay optical system, a color-synthesizing system, an illumination optical system, a projection optical system, and display element 11.

The light source device includes solid-state light source unit 6, reducing optical system 7, condensing optical system 8, diffuser 1f, and phosphor unit 9 shown in FIG. 1. The relay optical system is a component that guides the blue light that was transmitted through phosphor wheel 1i of phosphor unit 9 to the color-synthesizing system and includes lenses 2a, 2b, 2d, 2f, and 2h, and mirrors 2c, 2e, and 2g. The color-synthesizing system is a component that synthesizes the yellow fluorescent light, red fluorescent light, and green fluorescent light from phosphor wheel 1i and the blue light from the relay optical system, and includes dichroic mirror 3a, lens 3b, and light tunnel 3c. Dichroic mirror 3a is arranged on the optical path between diffuser 1f and lens 1g of the light source device. Lenses 2a, 2b, 2d, 2f, 2h, and 3b are all condenser lenses.

In the light source device, phosphor wheel 1i is rotated and excitation light (blue light) is successively irradiated on yellow phosphor region 10Y, red phosphor region 10R, green phosphor region 10G and the transmission region of gap 10a. The yellow fluorescent light from yellow phosphor region 10Y, the red fluorescent light from red phosphor region 10R, and the green fluorescent light from green phosphor region 10G successively pass through lens 1h and lens 1g, and are incident to one surface of dichroic mirror 3a of the color-synthesizing system. The excitation light (blue light) that has passed through the transmission region of gap 10a irradiates the relay optical system.

In the relay optical system, the blue light from phosphor wheel 1i passes through lenses 2a and 2b and is then reflected at approximately 90 degrees by mirror 2c. The blue reflected light from mirror 2c passes through lens 2d and is then reflected at approximately 90 degrees by mirror 2e. The reflected blue light from mirror 2e passes through lens 2f and is then reflected at approximately 90 degrees by mirror 2g. The reflected blue light from mirror 2g passes through lens 2h and is then incident to the other surface of dichroic mirror 3a of the color-synthesizing system.

Figure 7:
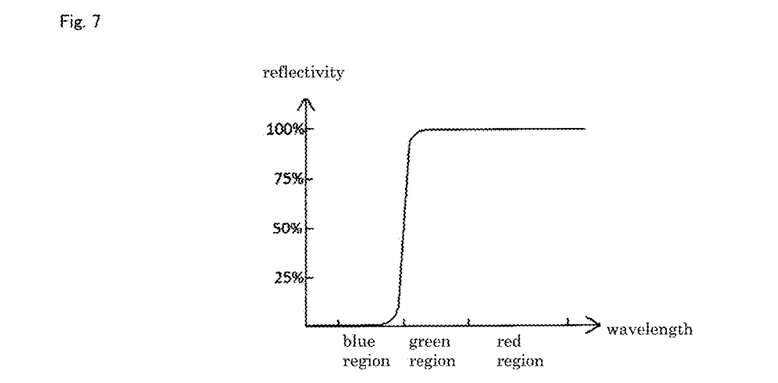
FIG. 7 is a characteristics diagram showing the spectral transmission characteristic of a dichroic mirror of the projector shown in FIG. 6.

FIG. 7 shows the spectral transmission characteristics of dichroic mirror 3a. Dichroic mirror 3a has the property of transmitting, of visible light, light of the blue wavelength band and reflecting light of other wavelength bands. Dichroic mirror 3a that has these characteristics can be realized by a dielectric multilayer film.

In the color-synthesizing system, dichroic mirror 3a transmits excitation light (blue light) from solid-state light source unit 6. In addition, dichroic mirror 3a reflects yellow fluorescent light, green fluorescent light, and red fluorescent light from phosphor wheel 1i and transmits blue light from the relay optical system.

The blue light that has passed through dichroic mirror 3a and the yellow fluorescent light, green fluorescent light, and red fluorescent light that were reflected by dichroic mirror 3a are all irradiated into lens 3b on the same optical path. Lens 3b condenses the blue light, yellow fluorescent light, green fluorescent light, and red fluorescent light from dichroic mirror 3a on one open end of light tunnel 3c. In other words, the yellow fluorescent light, red fluorescent light, green fluorescent light, and blue light are successively irradiated into light tunnel 3c.

Lenses 1g and 1h have the role of not only condensing excitation light upon phosphor wheel 1i, but also of converting each of the yellow fluorescent light, green fluorescent light, and red fluorescent light from phosphor wheel 1i to parallel luminous flux. The luminous flux diameter of the excitation light from reducing optical system 7 substantially matches the luminous flux diameter of the fluorescent light that is converted to parallel luminous flux by lenses 1g and 1h. In addition, the luminous flux diameter of the blue light that enters dichroic mirror 3c through the relay optical system also substantially matches the luminous flux diameter of the excitation light and fluorescent light. In this way, the capture angles of fluorescent light and blue light can be caused to match in the illumination optical system that follows light tunnel 3c, and uniform illumination light can be obtained. In addition, a configuration in which the excitation light for which the luminous flux diameter is reduced by reducing optical system 7 is supplied to dichroic mirror 3a enables miniaturization of condensing optical system 8, diffuser 1f, the relay optical system, and the color-synthesizing system.

Light tunnel 3c is a hollow construction with a rectangular parallelepiped shape, and light that entered one open end is propagated through the interior to exit from the other open end. One open end surface (incident surface) of light tunnel 3c is arranged at the position of the focal point of lens 3b. The irradiation surface of phosphor wheel 1i and the irradiation surface of light tunnel 3 are in an image-forming relation. Light that is exited from the other open end surface of light tunnel 3c is light having a rectangular uniform intensity distribution and is supplied to the illumination optical system.

The illumination optical system includes lenses 4a, 4b, and 4d and mirror 4c. Lenses 4a, 4b, and 4d are condenser lenses. Light that is exited from the other open end of light tunnel 3 successively passes through lenses 4a and 4b and is then reflected by mirror 4c. The reflected light from mirror 4c is irradiated into display element 4e by way of lens 4d. In this illumination optical system, illumination light that is kept at the rectangular uniform intensity distribution of the emission end of light tunnel 3c is enlarged and irradiated into display element 4e.

Display element 4e spatially modulates the luminous flux from the illumination optical system according to a picture signal to form an image. Display element 4e is, for example, a digital micromirror device (DMD). A DMD includes a plurality of micromirrors, each micromirror being configured to change its angle according to a drive voltage. The reflection angle when drive voltage that indicates the ON state is supplied is different from the reflection angle when drive voltage that indicates the OFF state is supplied. By effecting ON/OFF control of each micromirror according to the picture signal, the incident luminous flux is spatially modulated to form an image. In addition to a DMD, a liquid crystal panel can also be used as display element 4e.

The image that is formed by display element 4e is enlarged and projected on a projection surface by projection lens 5a of the projection optical system. The projection surface may be a component on which an image can be projected such as a screen or a wall.

According to this projector, adjusting the size of emitted fluorescent light enables balancing of the light emission efficiency of the light source device and the capture efficiency of the optical systems of subsequent stages, and can increase the light utilization efficiency of the combined optical systems in the entire projector.

The light source device and projector that have been described hereinabove are only examples of the present invention, and the configuration can be modified as appropriate.

In addition, the present invention can adopt the forms indicated in the following Supplementary Notes 1-5 but is not limited to these forms.

[Supplementary Note 1]

A light source device includes:

a phosphor unit that is provided with a phosphor;

an excitation light source that supplies excitation light that excites the phosphor;

a reducing optical system that reduces the luminous flux diameter of the excitation light that is supplied from the excitation light source; and a condensing optical system that condenses, on the phosphor unit, the excitation light for which the luminous flux diameter was reduced by the reducing optical system;

wherein the reducing optical system includes:

a plurality of lenses that include two or more lenses having positive power; and a holding section that holds the plurality of lenses, wherein: of the two or more lenses, the lens having the lowest positive power is arranged on the side of the excitation light source;

the holding section includes a lens-moving section that moves the lens having the lowest positive power back and forth along the direction of the optical axis of the reducing optical system; and the index of refraction of the lens having the lowest positive power is equal to or lower than the index of refraction of the other lenses of the reducing optical system.

[Supplementary Note 2]

In the light source device as described in Supplementary Note 1, the excitation light source includes:

a plurality of solid-state light sources that are arranged in array form; and a plurality of collimator lenses that convert the output light of each of the plurality of solid-state light sources to parallel luminous flux;

wherein:

the reducing optical system and the condensing optical system form the light source image of the plurality of solid-state light sources on the phosphor unit.

[Supplementary Note 3]

The light source device as described in Supplementary Note 1 or 2 further includes a diffuser that diffuses incident light and that is provided on the optical path between the reducing optical system and the condensing optical system.

[Supplementary Note 4]

A projector includes:

the light source device as described in any one of Supplementary Notes 1 to 3;

a display element that spatially modulates light that is supplied from the light source device to form an image; and a projection optical system that enlarges and projects the image that is formed by the display element.

[Supplementary Note 5]

The projector as described in Supplementary Note 4 further includes an illumination optical system that is provided with a light tunnel, in which output light of the light source device enters one open end and the entered light propagates through its interior to exit from the other open end, and that irradiates the light exited from the other open end of the light tunnel on the display element.

In the light source device of the above-described Supplementary Notes 1-3, the excitation light source, reducing optical system, condensing optical system, and phosphor unit each correspond to solid-state light source unit 6, reducing optical system 7, condensing optical system 8, and phosphor unit 9, respectively, shown in FIG. 1. The diffuser corresponds to diffuser if shown in FIG. 1.

In the projector of the above-described Supplementary Notes 4 and 5, the display element and projection optical system each correspond to display element 11 and projection lens 5a, respectively. In addition, the light tunnel corresponds to light tunnel 3c shown in FIG. 6.

EXPLANATION OF REFERENCE NUMBERS 1a solid-state light source
1b collimator lens
1c-1e, 1g, 1h lens
1f diffuser
1i phosphor wheel
6 solid-state light source unit
7 reducing optical system
7a lens moving section
8 condensing optical system
9 phosphor unit
9a drive unit

The invention claimed is:

1. A light source device comprising:
a phosphor unit that is provided with a phosphor;
an excitation light source that supplies excitation light that excites said phosphor;
a reducing optical system that reduces a luminous flux diameter of said excitation light that is supplied from said excitation light source; and
a condensing optical system that condenses, on said phosphor unit, excitation light for which the luminous flux diameter was reduced by said reducing optical system;
wherein:
said reducing optical system includes:
a plurality of lenses that include two or more lenses having positive power; and
a holding section that holds said plurality of lenses,
wherein:
of said two or more lenses, the lens having a lowest positive power is arranged on a side of said excitation light source;
said holding section includes a lens-moving section that moves said lens having the lowest positive power back and forth along a direction of the optical axis of said reducing optical system; and an index of refraction of said lens having the lowest positive power is equal to or lower than an index of refraction of other lenses of said reducing optical system.

2. The light source device as set forth in claim 1, wherein:
said excitation light source comprises:
- a plurality of solid-state light sources that are arranged in array form; and
- a plurality of collimator lenses that convert an output light of each of said plurality of solid-state light sources to parallel luminous flux; and
- said reducing optical system and said condensing optical system form the light source image of said plurality of solid-state light sources on said phosphor unit.

3. The light source device as set forth in claim 1, further comprising a diffuser that diffuses incident light and that is provided on an optical path between said reducing optical system and said condensing optical system.

4. A projector comprising:
the light source device as set forth in claim 1;
a display element that spatially modulates light that is supplied from said light source device to form an image; and
a projection optical system that enlarges and projects the image that is formed by said display element.

5. The projector as set forth in claim 4, further comprising:
an illumination optical system that is provided with a light tunnel that, in which output light of said light source device enters one open end and the entered light propagates through its interior to exit from the other open end, and that irradiates the light exited from the other open end of the light tunnel on said display element.

6. The projector as set forth in claim 4, wherein said lens-moving section moves said lens having the lowest positive power so that a focused focal distance of said two or more lenses having positive power changes.

7. The projector as set forth in claim 6, wherein said lens-moving section moves said lens having the lowest positive power so that an irradiation spot size of said excitation light on said phosphor changes.

8. The light source device as set forth in claim 1, wherein said lens-moving section moves said lens having the lowest positive power so that a focused focal distance of said two or more lenses having positive power changes.

9. The light source device as set forth in claim 8, wherein said lens-moving section moves said lens having the lowest positive power so that an irradiation spot size of said excitation light on said phosphor changes.

10. The light source device as set forth in claim 1, wherein the lens-moving section that moves the lens having the lowest positive power back and forth along the direction of the optical axis of said reducing optical system comprises a movement axle with a feed screw for moving a lens frame holding the lens having the lowest positive power.

11. The light source device as set forth in claim 10, wherein the lens-moving section further comprises a rotation section linked to the movement axle such that a rotation of the rotation section in a first rotation direction causes the lens having the lower positive power to move along the optical axis toward the excitation light source and a rotation of the rotation second in a second rotation direction opposite the first rotation direction causes the lens having the lower positive power to move along the optical axis away from the excitation light source.

12. A projector, comprising:
a light source device;
a display element that spatially modulates light that is supplied from said light source device to form an image; and
a projection optical system that enlarges and projects the image that is formed by said display element,
wherein said light source device comprises:
- a phosphor unit that is provided with a phosphor;
- an excitation light source that supplies excitation light that excites said phosphor;
- a reducing optical system that reduces a luminous flux diameter of said excitation light that is supplied from said excitation light source; and
- a condensing optical system that condenses, on said phosphor unit, excitation light for which the luminous flux diameter was reduced by said reducing optical system;

wherein:
said reducing optical system includes:
- a plurality of lenses that include two or more lenses having positive power; and
- a holding section that holds said plurality of lenses, and wherein:
of said two or more lenses, the lens having a lowest positive power is arranged nearest to said excitation light source, and
said holding section includes a lens-moving section that moves said lens having the lowest positive power back and forth along an optical axis of said reducing optical system such that a focused focal distance of said two or more lenses having positive power changes and such that an irradiation spot size of said excitation light on said phosphor changes.

13. The projector as set forth in claim 12, wherein an index of refraction of said lens having the lowest positive power is equal to or lower than an index of refraction of other lenses of said reducing optical system.

14. The projector as set forth in claim 12, further comprising an illumination optical system that is provided with a light tunnel in which output light of said light source device enters one open end and the entered light propagates through its interior to exit from the other open end and light exiting the light tunnel from the other open end of the light tunnel irradiates on said display element.

15. The projector as set forth in claim 12, wherein said excitation light source comprises:
- a plurality of solid-state light sources that are arranged in an array form; and
- a plurality of collimator lenses that convert an output light of each of said plurality of solid-state light sources to parallel luminous flux; and
- wherein said reducing optical system and said condensing optical system form the light source image of said plurality of solid-state light sources onto said phosphor unit.

16. The projector as set forth in claim 12, wherein said light source device further comprises a diffuser that diffuses incident light and that is provided on an optical path between said reducing optical system and said condensing optical system.

17. A method of controlling a light intensity in a projector comprising an excitation light source for supplying an excitation light onto a phosphor unit, said method comprising:

providing a reducing optical system that reduces a luminous flux diameter of said excitation light supplied from said excitation light source, said reducing optical system including a plurality of lenses that include two or more lenses having positive power and a holding section that holds said plurality of lenses, such that, of said two or more lenses, the lens having a lowest positive power is arranged nearest to said excitation light source; and providing a condensing optical system that condenses, on said phosphor unit, excitation light for which the luminous flux diameter was reduced by said reducing optical system, wherein said holding section includes a lens-moving section that can selectively move said lens having the lowest positive power back and forth along an optical axis of said reducing optical system such that a focused focal distance of said two or more lenses having positive power changes as the lens-moving section is moved.

18. The method as set forth in claim 17, wherein an irradiation spot size of said excitation light on said phosphor changes as said lens-moving section moves said lens having the lowest positive power back and forth along the optical axis.

* * * * *